Patented Sept. 2, 1930

1,774,665

UNITED STATES PATENT OFFICE

GEORGE OWENS PIERCE, OF RAWLINS, WYOMING

CLEANING AND POLISHING COMPOUND

No Drawing.      Application filed April 1, 1927. Serial No. 180,342.

This invention relates to a cleaner and polisher and while particularly useful as regards paint surfaces, has been found equally effective in connection with any articles having a nice finish.

In a treating material of this character, as where used on the surfaces of automobiles which are frequently finished in high lustre paint, varnish, enamel, and baked enamel, as well as the so called "Duco" finish, certain fundamentals must be considered.

To this end, the present compound contains a very small amount of oily material and no grit, alkali, or salts of the fatty acids.

The use of the invention leaves a dry, hard and non-spotting finish and one which does not collect dust. Moreover, one treatment will leave a long wearing weatherproof finish and the lustre may be renewed by merely wiping over the surface from time to time.

The compound consists of colloidal clay having the following analysis:

|  | Per cent |
|---|---|
| Silica | 57.98 |
| Ferrous oxide | 0.12 |
| Ferric oxide | 3.80 |
| Alumina | 22.46 |
| Lime | 1.92 |
| Magnesia | 3.24 |
| Soda and potash | 1.35 |
| Sulphur trioxide | 0.75 |
| Calcium carbonate | 3.14 |
| Sodium sulphate | 1.34 |
| Water | 3.82 |

This material is ground to fineness and mixed in a suitable amount of water and agitated sufficiently to form a thin, creamy mixture. This mixture more closely resembles what is known as a colloidal suspension wherein the particles of solid are evenly distributed in finely divided condition in the liquid.

To this suspension there is added a warm solution of paraffin, wax or rosin in kerosene, and the ingredients are agitated thoroughly. Thereafter, a coloring material may be added conforming to the color of surface to be treated.

The method of preparation for bottling will now be set forth:

The colloidal clay in dry form is mixed with water in the following proportions: colloidal clay, 1 ounce; water, 12 fluid ounces. These are agitated at frequent intervals until a smooth mixture is obtained. It is then set aside in an air tight container for seventy-two hours at which time it is ready to mix with other ingredients.

Paraffin wax, or rosin, is put in solution with coal oil, or other solvent, in the following proportions: wax, or rosin, 30 grains; coal oil, or other solvent, 1 fluid ounce.

The wax, or rosin, is melted at a low degree of heat, and added to the coal oil, or other solvent, which should be slightly heated. This should be set aside in an air tight container and kept at a temperature of not over 60° Fahrenheit for at least sixty hours at which time it is ready to mix with colloidal clay and water mixture.

The mixture of water and colloidal clay and the solution of wax, or rosin, and coal oil, or other solvent is placed together in the following proportions: solution of coal oil, or other solvent, and wax, or rosin, 1½ fluid ounces; mixture colloidal clay and water, 14½ fluid ounces.

These are agitated for a period of ten hours in an air tight container at a temperature of 80° Fahrenheit. It is then set aside but is agitated at frequent intervals for a period of thirty days. At the expiration of this time, it is ready to be colored and bottled, and used on surfaces to be cleaned and polished.

The proportions as above recited may be slightly changed to increase abrasive power, or give thicker film to polish.

The colloidal clay employed which is a species of wilkinite, absorbs or dissolves grease, dust and scum, and under test by reason of the suspensoid properties of the cleaner, shows no marring of the finish but rather a restoration of the original lustre.

The suspension is so evenly formed as to give maximum effectiveness, and it is not necessary to shake the preparation before applying as in the case of emulsions.

The amount of wax or rosin and solvent such as kerosene employed in this compound is so very small that it does not retard abrasive action of the suspensoid. As a result of tests, it appears that the suspensoid assists in maintaining the small oily content in solution. The wax acts as a carrier and lubricant to some extent without affecting the abrasive qualities of the colloid and also serves to stabilize the film which is formed on the surface when the compound is initially applied. Only a very small quantity of the thickening material is present however.

The application of the cleaning and polishing fluid upon a surface leaves a stable film and thus the cleaner and polisher may be spread over a large surface and then thoroughly rubbed. There results a clean dry polished and lasting surface which is weatherproof.

Moreover, the small oil content leaves a surface which does not show finger marks and will not collect dust.

The compound is useful upon all types of surfaces requiring a nice finish and is equally effective upon metal, glass or wood.

It will be understood that the quantities of materials set forth may be varied as occasion may require dependent upon the character of surface to be treated.

What I claim is:

1. A compound for treating surfaces, comprising a colloidal suspension consisting of a clay having substantially the following analysis:

|  | Per cent |
|---|---|
| Silica | 57.98 |
| Ferrous oxide | 0.12 |
| Ferric oxide | 3.80 |
| Alumina | 22.46 |
| Lime | 1.92 |
| Magnesia | 3.24 |
| Soda and potash | 1.35 |
| Sulphur trioxide | 0.75 |
| Calcium carbonate | 3.14 |
| Sodium sulphate | 1.34 |
| Water | 3.82 | suspended in water, and a relatively small oily content comprising one of a group of thickening agents including wax and paraffin.

2. A compound for treating surfaces consisting of a colloidal suspension of wilkinite and a small quantity of one of a plurality of thickening agents including wax and paraffin.

3. A compound for cleaning and polishing surfaces consisting of wilkinite in colloidal suspension, and a relatively small quantity of a thickening and lubricating agent of a series including wax and paraffin dissolved in the compound.

4. A compound of the class described consisting of a colloidal suspension of wilkinite in water substantially 14½ fluid ounces, and a thickening and lubricating agent of one of a series including wax and paraffin 1½ fluid ounces in solution.

5. The process of preparing a cleaning and polishing compound which consists in mixing a colloidal suspension of wilkinite with a solution of a thickening and lubricating agent of a series comprising paraffin and wax and agitating the mass in the absence of air, the said thickening and lubricating agent comprising a small fractional part of the mass.

6. The process of preparing a cleaning and polishing compound which consists in mixing a colloidal suspension of wilkinite with a solution of a thickening and lubricating agent of a series comprising paraffin and wax, agitating the mass in the absence of air, and adding a coloring agent, the said thickening and lubricating agent comprising a small fractional part of the mass.

7. A compound for treating surfaces consisting of a colloidal suspension of wilkinite and a non-alkali thickening agent, the thickening agent constituting a small fractional part of the mass.

8. A compound for treating surfaces consisting of a colloidal suspension of wilkinite and a non-alkali thickening agent having a melting point below substantially 140° C.

9. A compound for treating surfaces comprising a colloidal suspension of wilkinte and a non-alkali thickening agent having a melting point below substantially 140° C., said thickening agent constituting a small fractional part of the mass.

In testimony whereof I have hereunto set my hand.

GEORGE OWENS PIERCE.